United States Patent [19]

Falconer

[11] 4,421,207

[45] Dec. 20, 1983

[54] COMBINATION ANTI-FRICTION BEARING AND FORCE-GENERATING MECHANISM

[76] Inventor: David G. Falconer, 4673 S. 34 St., Arlington, Va. 22206

[21] Appl. No.: 319,910

[22] Filed: Nov. 10, 1981

[51] Int. Cl.³ .............................. F03G 3/06; F16F 1/26
[52] U.S. Cl. ........................................ 185/29; 185/27; 267/160; 368/168; 368/179; 308/2 A
[58] Field of Search .................... 185/27, 29; 308/2 A, 308/3 R; 267/160; 248/317; 272/89; 434/300, 302; 368/168, 179

[56] References Cited

U.S. PATENT DOCUMENTS 3,295,808  1/1967  Webb .............................. 267/160 X
3,756,556  9/1973  Georgi ............................ 267/160 X

FOREIGN PATENT DOCUMENTS 464612  7/1951  Italy .................................... 368/179

Primary Examiner—Allan D. Herrmann

[57] ABSTRACT

A combination linear bearing and force-generating mechanism comprising an outer frame attached to a first set of cams and an inner shaft attached to a second set of cams. Flexible pendulums connect and wrap around the first and second set of cams, the flexible pendulum being formed and constrained thereby to produce non-arcuate, linear mobility to the inner shaft.

9 Claims, 12 Drawing Figures

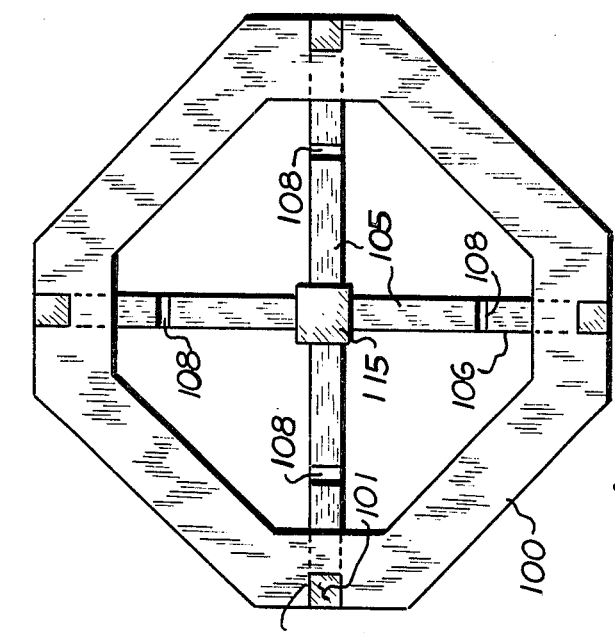
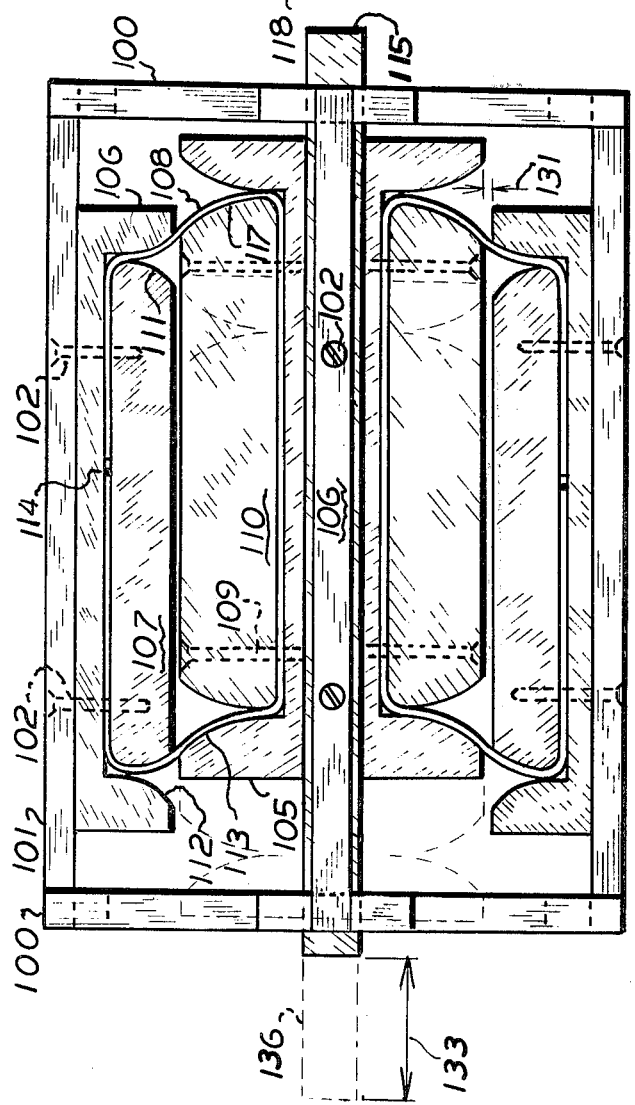
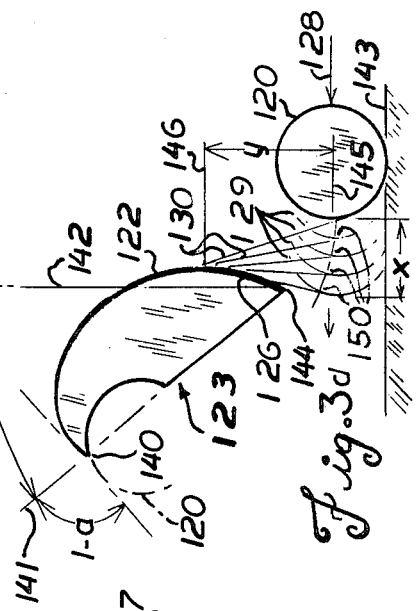
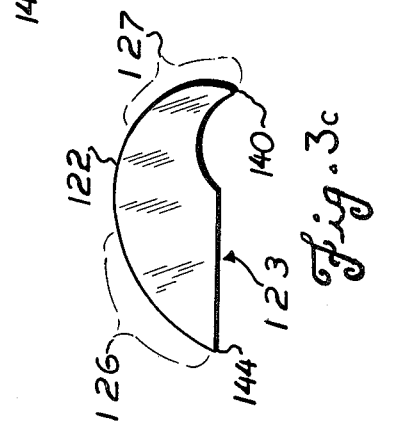
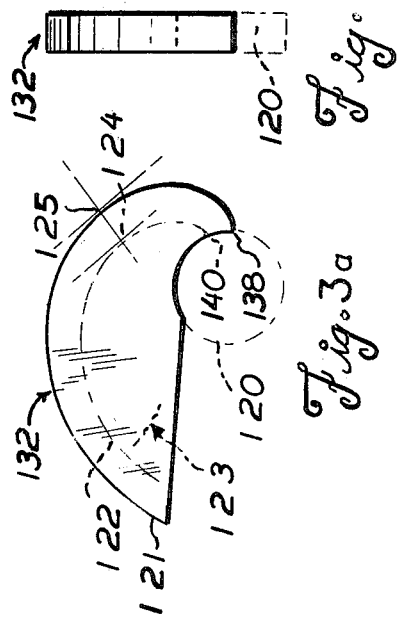

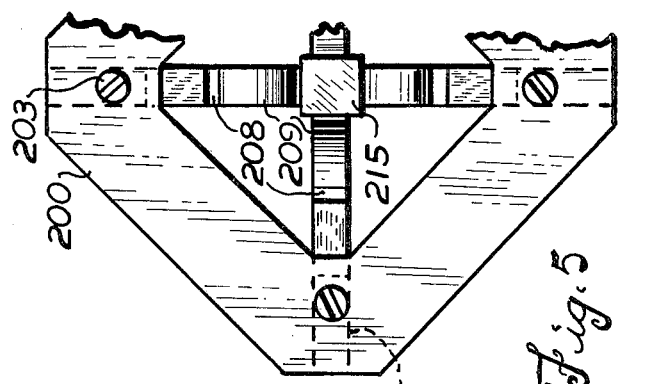
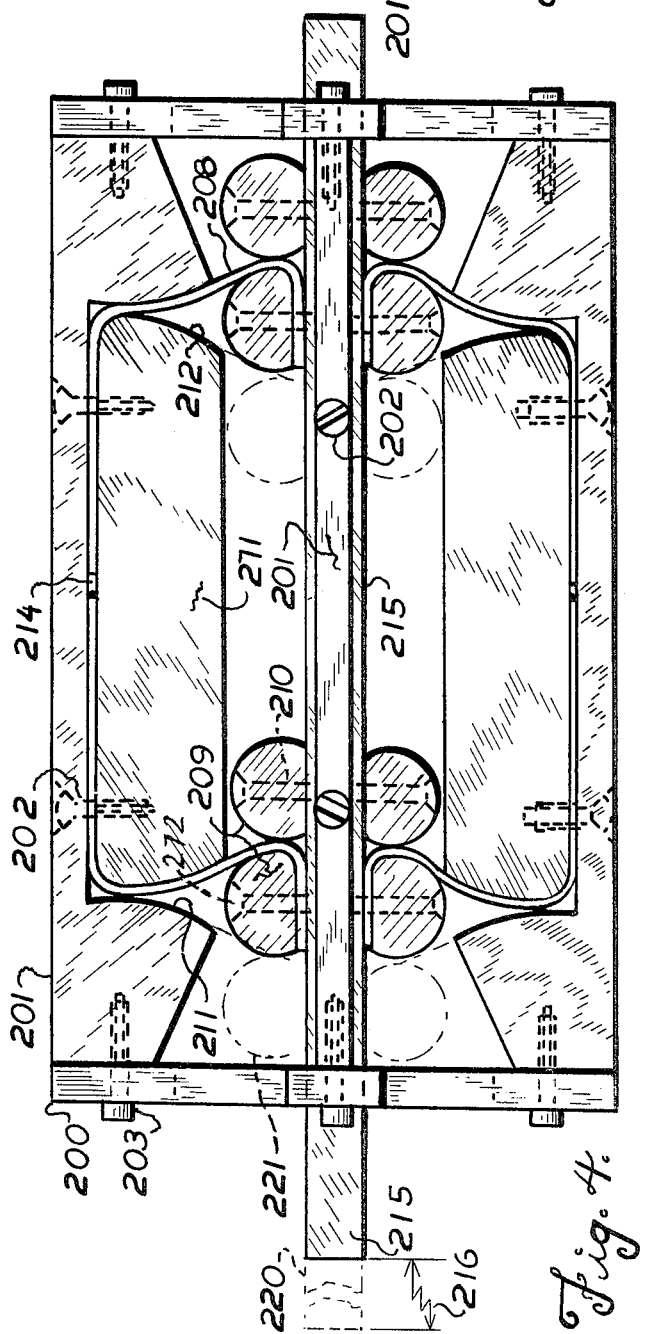

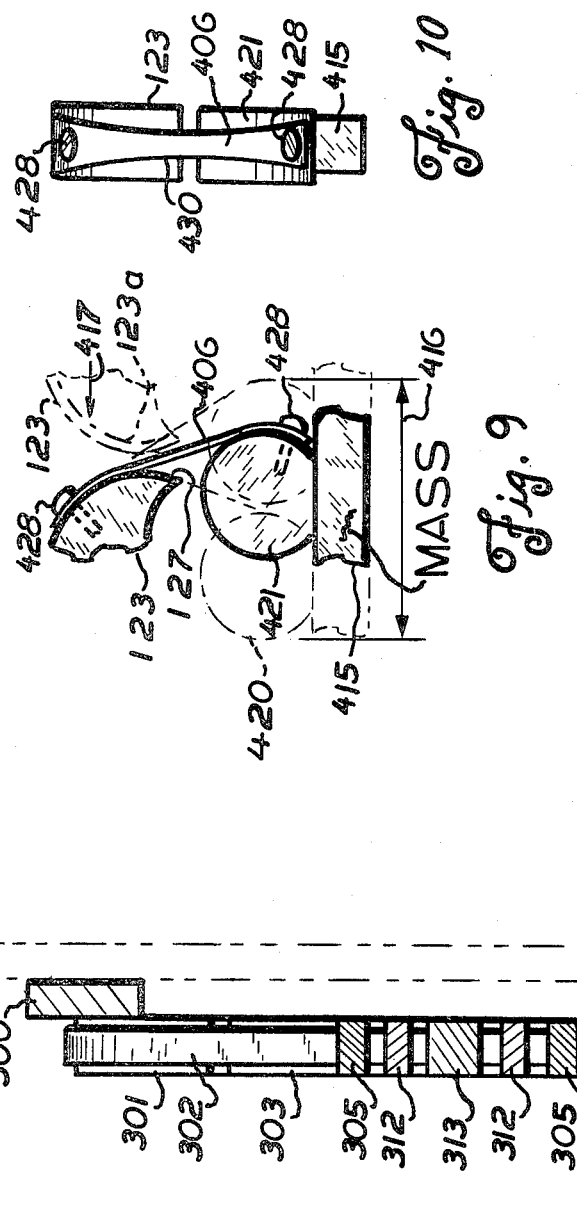

COMBINATION ANTI-FRICTION BEARING AND FORCE-GENERATING MECHANISM

BACKGROUND OF THE INVENTION

It is a common purpose of linear, reciprocating bearings to be made as free of friction as possible and having lubrication and contamination from foreign matter provided for.

The prior art seems to solve the anti-friction requirements either by: (1) Rollers; (2) Balls which recirculate; (3) Smooth, low coefficient material forming sleeves, such as, Teflon, Nylon and the like; (4) Smooth, but lubricated material of very old tradition such as bronze, brass or babbit, etc. Such prior art relies upon lubrication by equally old and traditional methods, too numerous to list. As for contamination, reliance is placed upon wipers, in themselves a source of friction. As will be seen, this invention seems relatively free and immune from most of these problems.

SUMMARY OF THE INVENTION

A primary purpose of this invention is to provide a shaft which works in a linear manner within a suitable frame and which operates with such a low coefficient of frictional resistance that it can be used in the most sensitive instruments and machinery. Two examples are seisimographs and accelerometers. It is also not necessary to furnish lubrication or protection against ordinary contamination from foreign matter. It is relatively free from temperature changes.

At the expense of reiterating material from the Abstract, the invention comprises an outer frame or housing which encloses a reciprocating shaft; the frame has attached to it two drum type cams which are placed adjacent to each other and at a convenient distance apart to lend stability to the movement of the shaft; the shaft also is attached to two adjacent drum type cams which are placed at the same distances apart as the cams which are attached to the frame.

A flexible ribbon-like or string-like pendulum is connected at one of its ends to the cam which is attached to the frame; in a similar manner the pendulum is connected at its opposite end to that cam which is attached to the reciprocating shaft. A portion of the length of each end of the flexible pendulum wraps around each drum cam—the cam attached to the frame and the cam attached to the shaft; for, the provision of the drum cams to bend and constrain the flexible pendulum is the salient principle of this invention, in which the geometrical values of the cam contours are so calculated that a mathematical function exists in the cam and pendulum assembly which effectuates a non-arcuate pendulum swing and linear shaft movement.

When this invention is to be used strictly as an extremely low-friction bearing the pendulum is made of material as flaccid as possible, consistent with tensile strength and other physical properties; however, when it is to be used as a force measuring or spring force device, a material such as berylium-copper, spring steel, or phosphor-bronze is used.

It will be described later how this invention can be used as a spring measuring force which is inherently resistant to spurious, endogenous harmonics which usually must be removed from the system by some sort of damping action.

DESCRIPTION OF THE DRAWINGS

FIG. 1 is a side elevation of a species of the invention using modified involute contoured cams attached to both the frame and the shaft.

FIG. 2 is an end view of the species of FIG. 1.

FIG. 3a is a diagrammatic side elevation of a generic involute contoured drum cam and, in phantom view, the circular drum cam from which it is pictured as being generated, including modifications.

FIG. 3b is an end view of the diagrammatic illustration of FIG. 3a.

FIG. 3c is a side elevation of the diagrammatic involute drum type cam of FIG. 3a after modification.

FIG. 3d is a diagrammatic drawing of the involute curve of FIG. 3c in conjunction with the mating circular contoured drum type cam which was shown in phantom treatment in FIG. 3a, together with lines representing the flexible pendulum and cam relationship which is characteristic of all of the species.

FIG. 4 shows a side elevation of a species in which the frame has involute contour drum type cams mated with the circular contour cams attached to the shaft.

FIG. 5 is an end view, partially broken away, of the species of FIG. 4; the broken away portion is symmetrical with the left side of FIG. 5.

FIG. 8 is an end view of the species shown in FIG. 7.

FIG. 9 shows an elevation of an isolated pendulum and cam assembly to explain certain technical facets of all the species in general.

FIG. 10 is an end view of the diagrammatic illustration of FIG. 9.

DETAILED DESCRIPTION OF THE DRAWINGS

Figure 7:
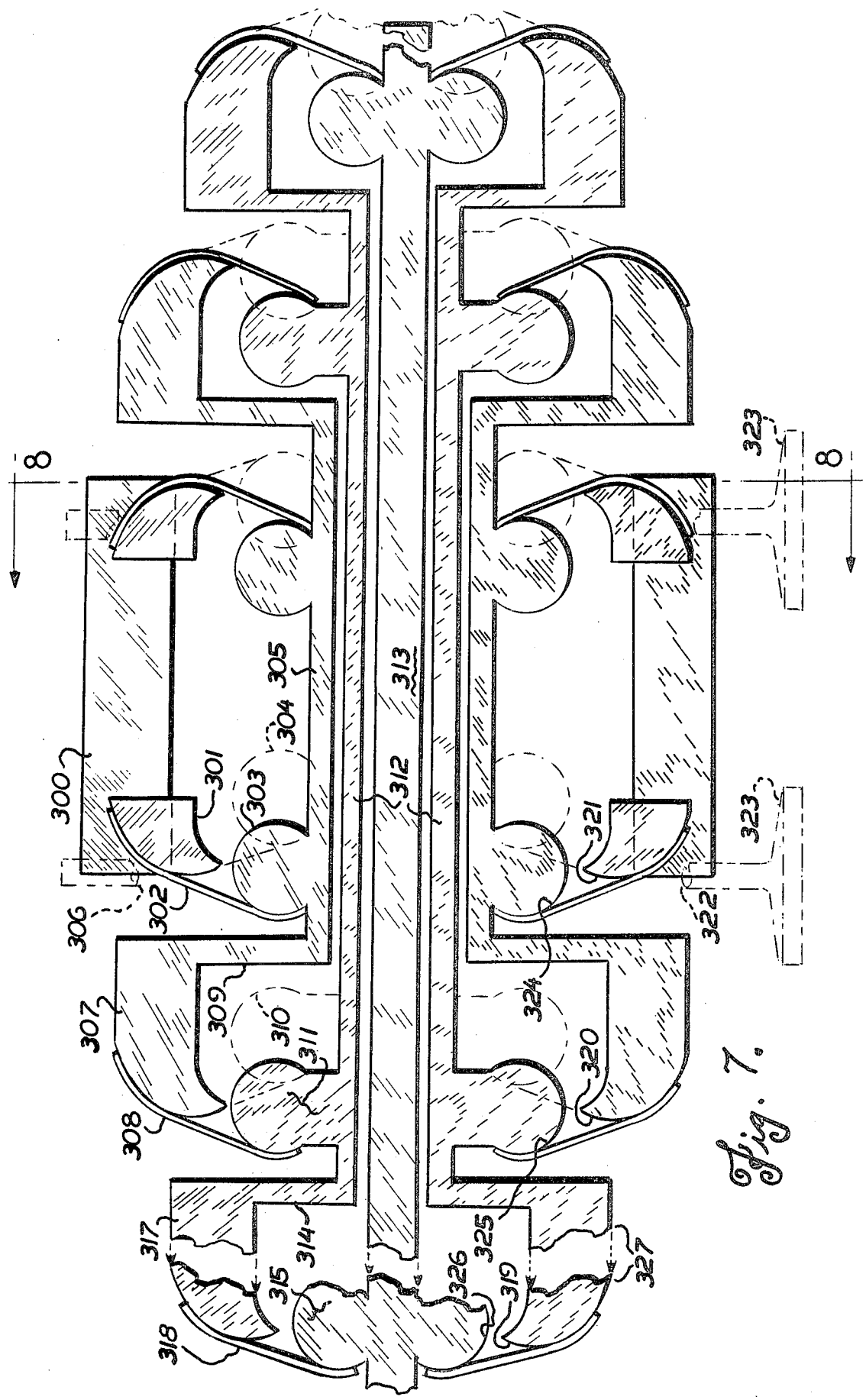
FIG. 7 is an elevational view of the essential structure of another species of the invention.

In FIG. 1 and FIG. 2 an end plate structure 100 is provided with four mortised sockets 118 into which are fitted longitudinal frame members 101, together forming the frame. No attempt to depict product design has been made in any of figures in this description; rather, they are copied from ¼" thick plywood models. Parts obviously joined together and otherwise not indicated are cemented. A "U" shaped long member 106 is formed at each end with a cam contour 112 which is elaborated upon later as that portion of the involute 122 of FIG. 3c and is marked 127 by a bracket. The next structure is the long ribbon-like member which makes up the dual flexible pendulum 108 which is here shown as one piece with its ends 114 brought together. To afford the reader with some conception of scale, on an experimental model the dual flexible pendulum is 0.004" thick and ¼" wide, the width of the surrounding rigid supporting structures. The next piece is a long member 107, the ends of which are formed into contours of cams 111 at each end. The contours of the cams 111 are identical to the cam contour 112. The dual flexible pendulum 108 is clamped between the long member 107 and longitudinal frame member 101 and secured by two screws 102 which, of course, secures the frame member 101, the dual pendulum 108 and the long member 107 together. A second long member 110 which is formed at each end with an involute contour cam 117 is shown situated parallel to the first long member 107 with the smallest possible clearance 131 particularly at the ends of the involute cam contours 111, 113, 112, 117; this is so that the dual flexible pendulum 108 will be supported and have its curvature governed by rigid cam contours, irrespective of the position of shaft 115. A third "U" shaped long member 105 is formed at each end into a cam contour 113 which is elaborated upon later as that portion of the involute 122 of FIG. 3c and is marked 126 there by a bracket; the contour 113 is identical to the contour 117 of the second long member 110. The second long member 110 clamps the dual flexible pendulum 108 to the third "U" shaped long member 105 which is, in turn, joined to the shaft 115; this is accomplished by screws 109 which penetrate these structures and thread into the shaft 115. All of the rigid structures just described in this paragraph which support and govern the contour of the dual flexible pendulum 108 should, ideally, be made of a material having the same thermal coefficent of expansion as that of the dual flexible pendulum 108 so as to make the shaft 115 as free as possible from temperature conditions. It should also be evident that the structures described in this paragraph occur four times by reference to FIG. 1 and FIG. 2 be repeated as often as desired and to be equipped with as many pendulums as needed.

In FIG. 3a, a circle 120 shown in phantom is used to develop an involute curve 121 which from its start at a point 138 on the circle 120 must be cut or formed as accurately as possible. While other mating curves which are mathematical functions of each other can be arrived at through different approaches, this whole cam generation generally indicated by the arrow 132 is convenient and simple to follow with the least sophisticated machine processes. If the contour of the just cut-out cam contour 121 were used in FIG. 1 in place of that already described, proper function of the invention would take place; however, the travel of the shaft 115 shown by the arrows 133 would be diminished. However, this shortcoming can be remedied quite readily as follows: At a point 140 on the circle 120 inside the curve 121, a line 122, in phantom, is developed, indexed from line 121 at every and any point 125 on line 121 an equidistant amount as the point 138 on the circle 120 is from the point 140. A gain will result in making a contour 122 which will direct and constrain the dual flexible pendulum 108 to describe a larger travel because of a wider angle of swing. The distance involute figure 132 has been trimmed—i.e., the distance between the point 140 on line 122 is from a corresponding point 138 on line 121 is a matter of judgement until a point of diminishing returns is reached. The modified involute 132 results in the new generalized cam contour generally designated by the arrow 123 which will be recognized in FIG. 3c. As the involute contour 132 is, naturally, a function of the circle 120 from which it is generated it is also a function of another involute countour, as is, also, the modified contoured structure 123 adaptable to perform as intended to transform the working of a conventional pendulum swing from a simple pivot and therefore describing an arc at the end to the action of the pendulum of this invention as a straight line.

The purpose of the inclusion of FIG. 3d is as an aid in visualizing the dimensional mechanics of the flexible pendulum in all of the drawings and description in its operation in transforming arcuate action into non-arcuate action. In FIG. 3d it should be imagined that the finished cam 123 prepared from its parent involute cam 132 of FIG. 3a and shown in FIG. 3c is held by some means, not shown. At the same time, however, suppose it is allowed to pivot on its end point 144. Suppose, also, that the circle 120 of FIG. 3a is slidable in the right and left direction indicated by the arrow 128, without rotation upon the fixed surface 143. If a ribbon is fastened to the contour 122 and the face of this circle drum cam 120, and the cam is pivoted on the point 144, then, at some angle $\theta$, the position will be found which affords the maximum travel "X" without any tendency of the center line 145 of the circle cam 120 to rise off of or away from the surface 143, nor to rotate. A line 142 is drawn through the pivot point 144 and perpendicular to the surface 143 for reference purposes. A distance "Y" is the measurement from the point of tangency of the flexible pendulum 130 with the circle drum cam 120 to the point of tangency of the pendulum 130 with the contour surface 122. This latter notation is of importance since the ratio of "X" to "Y" determines the space consuming efficiency of the device; i.e., the dimension "X" is the travel of the shaft while the dimension "Y" determines the diameter of the device, ultimately. By following the different selected positions 129 of the drum cam 120 it will be understood how the slack of the flexible pendulum 130 is used up as the wrap-around of the contours and points of tangency 150 change, turning upward as the circle cam 120 is moved to the left in the five incremental steps shown.

In FIG. 4 and FIG. 5 end plates 200 are fastened by screws 203 to longitudinal members 201 which are shaped at the inside concave recess or "U" shape by cam contours 211. Clamped against the longitudinal member 201 is the dual flexible pendulum 208 with the same provision as those of FIG. 1 and on its other side a long member 271 having cam contours 212 formed of each of its ends; this assembly is fastened by screws 202. Circle cams 209 are fastened to the reciprocating shaft 215 by screws 272, which in one half the cases also fasten the dual flexible pendulum 208 to the shaft 215 which is indicated 220 at its leftward position 216.

The species shown in FIG. 7 and FIG. 8 showing an extension of the principles upon which the previous structures were based and which is generic to all is mounted to laboratory apparatus stands 323 in dotted lines broken away 322 and continued as indicated by numeral 306; to show framework and other structures after the prior illustrations would be repetitious. On each side of the shaft 313 all parts shown are symmetrical and easily recognized as such. A long tie bar or frame member 300 is fastened, by any convenient method not shown, to the laboratory apparatus stands 323. Fastened to the tie bars 300 are a pair of drum cams 301 to which are fastened flexible pendulums 302 which wrap around the drum cams 301 and wrap around the drum circle cams 303 to which they are, in turn, attached. It will be apparent that a yoke appearing structure comprising an involute drum cam 307, having vertical elements 309 and a long structure 305 serves as an intermediate or second stage carriage. Flexible pendulums 308 are attached to and wrap around the cams 307 and then wrap around and are attached to the circle cams 311, thereby forming a third carriage; the third carriage is made up of a drum involute type cam 317 and an upright support 314 which then is joined to the symmetrically opposite side by a long member 312. Flexible pendulums 318 are next attached to and wrap around circle cams 315 and involute type cams 317. The circle cams 315, by being attached to the shaft 313 form the final stage so that using the same general structures of the previous FIG. 1 through FIG. 5 a 3:1 amplification is obtained in the shaft travel.

In the previous figures and description the invention has been treated with the single aspect of a sensitive bearing. In FIG. 9 and FIG. 10 its attributes as both a bearing and a force-applying or measuring device will be discussed. In FIG. 9 an involute type drum cam 123 taken from the area 127 of FIG. 3c. A screw 428 holds an appropriate spring material flexible pendulum 406 not only to the involute type cam 123 but also to the circle drum cam 421, which cam 421 is attached to a mass 415 which is free to reciprocate in the direction and to the amplitude indicated by the arrow 416 and the dotted lines 420 representing the movement of the cam 420. Note that the shape 430 of the sides of the pendulum 406 is curved; this is illustrated in this manner only to indicate that the pendulum can be charaterized in shape to produce the desired constant or force pattern. It is here that an advantage over force generating devices depending upon spring operation will be evident; this device is inherently resistant to harmonic action which can result in spurious results which are self-induced. If a cam 123a similar to the cam 123 is brought up in the direction of the arrow 417 until it changes the pendulum 406 to the other cam 123, the mooring or support of the pendulum 406 changes infinitely with oscillation or the reciprocating movement of the mass 415. This is a case where the spring constant of the vibrating forces or system varies with the displacement and the restoring force is no longer proportional to the displacement. The natural frequency of systems involving such springs so supported depends upon the magnitude of the amplitude. If because of resonance, the amplitude of vibration begins to increase the frequency of vibration changes, i.e., the resonance condition disappears. In the case shown in FIG. 9 the spring pendulum 406 is in contact with the cam 123 or the mating cam 123a. Because of this the free, length of the pendulum 406 varies with the amplitude so that the rigidity of the pendulum 406 increases with increasing deflection; i.e., the frequency of vibration increases with an increase in amplitude. Of course, resonance which is undesirable is not completely eradicated by this device, since, according to the Fourier Theorem, any (repeating) motion can be treated as the sum of a series of simple harmonic motion, it should be remembered that there can be many springs in each and any species of this invention. In FIG. 1 and FIG. 2, for instance, four pendulums 108 are shown at each end. There could, conceivably be many more; furthermore, each spring pendulum 108 could be made to have a different natural resonant frequency.

It will be obvious to those skilled in the art that various changes may be made in the invention without departing from the scope and spirit of the invention; therefore, the invention is not limited to what is shown in the drawings and described in the specification but is to be determined from the appended claims.

What is claimed is:

1. In a linear bearing and force generating mechanism, an outer frame having a first set of cams attached thereto, an inner shaft having a second set of cams attached thereto, flexible pendulums connecting and partially wrapping around said first and said second set of cams, the contours of said first set of cams and said second set of cams being so shaped that said flexible pendulums are formed and constrained by contact around said contours that the swinging movement of said flexible pendulums cause said shaft to move in a non-arcuate and linear manner.

2. Linear bearing and force generating mechanism as claimed in claim 1 wherein said contours of said first set of cams and said second set of cams are formed into a mathematical function of each other in such a relationship that arcuate response of the swinging of said flexible pendulums are compensated by said contours forming action in combination to effect non-arcuate motion of said shaft.

3. Linear bearing and force generating mechanism as claimed in claim 2 wherein of the two sets of cams claimed, the said first set of cams and the said second set of cams, one of the said two sets of cams comprises involute cams and the other of the said two sets of cams comprises circle cams.

4. Linear bearing and force generating mechanism as claimed in claim 2 wherein of the two sets of cams claimed—the said first set of cams and the said second set of cams—at least one of said two sets of cams is a modified involute cam and the other of said two sets of cams is a also a function of a circle, the contour of said modified involute cam following the contour of an involute curve and on the inside of said involute curve and every point on said modified involute cam lying at a uniform distance from a corresponding point on said involute curve and between the said involute curve and the circle of generation from which the said involute curve is developed.

5. Linear bearing and force generating mechanism as claimed in claim 2 wherein said flexible pendulums are made of spring material.

6. Linear bearing and force generating mechanism as claimed in claim 5 wherein said flexible pendulums differ as individuals each from the other in that they have different natural resonant frequencies.

7. Linear bearing and force producing mechanisms as claimed in claim 5 wherein said flexible pendulums are shaped to produce required spring constants.

8. Linear bearing and force generating mechanisms as claimed in claim 2 wherein said outer frame, said first set of cams, said second set of cams, said flexible pendulums, are duplicated in a plurality and radially located about said inner shaft, said second set of cams being attached thereto and structural means provided to connect said outer frame of one said plurality to another said outer frame.

9. In a pendulum mechanism for controlling linear motion, a supporting frame and a linear moving shaft, said supporting frame being provided with a first set of cam contours and said linear moving shaft being provided with a second set of cam contours, flexible pendulum means provided to interconnect said supporting frame and said linear moving shaft, said first set of cam contours and said second set of cam contours, both contacting, guiding and forming said flexible pendulum means by reason of their contours to impart linear, non-arcuate motion to said linear moving shaft.

* * * * *